May 13, 1930.  H. MORGAN  1,758,756
COAL AND REFUSE TESTER
Filed Sept. 5, 1929
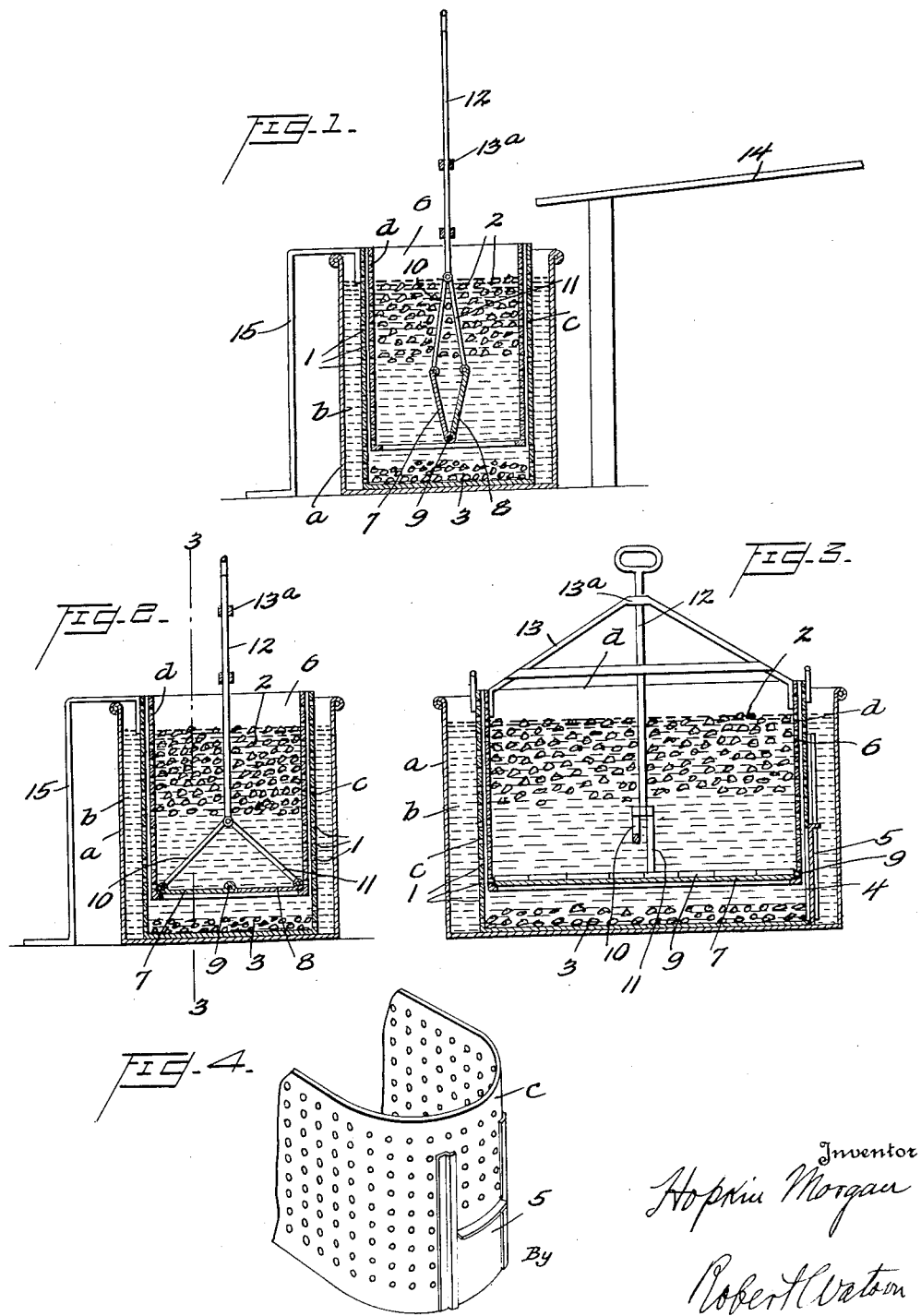
Inventor
Hopkin Morgan
By Robert H Watson
Attorney Patented May 13, 1930

1,758,756

UNITED STATES PATENT OFFICE

HOPKIN MORGAN, OF SCRANTON, PENNSYLVANIA

COAL AND REFUSE TESTER

Application filed September 5, 1929. Serial No. 390,644.

This invention relates to an apparatus for determining the percentages of different substances in samples of mixed materials having different specific gravities, such as coal and slate.

In carrying out the invention, I provide a sheet metal tank open at the top and containing a liquid in which the lighter materials in the sample, such as coal, will float, and in which the heavier material, such as slate, will sink. For the separation of coal and slate the liquid used is preferably a solution of zinc chloride.

A container for the sample to be tested consists of a receptacle open at the top and having finely perforated side walls and having a door in its lower part, this container being of the same general shape as the tank, but of smaller dimensions so that it can be readily inserted into and sunk within the tank. The sample of mixed materials, such as coal and slate, is placed within the container and when the container is sunk into the tank the coal will float in the liquid which passes through the perforations in its walls, while the slate will remain on the bottom of the container.

To remove the coal from the liquid, leaving the slate in the container, I provide a trap of the same general shape in cross section as the sample container and adapted to fit closely within the container. The walls of the trap are finely perforated and the bottom of the trap comprises two parts, hinged to a rod which extends between opposite walls of the trap. The free ends of these bottom parts are connected by links to a rod which is adapted to slide vertically in the center of the trap. By moving this rod upwardly, the two parts of the bottom swing upwardly and are drawn together. The trap is then sunk within the container and the coal, floating in the liquid, passes into the trap without being impeded by the door. The vertically movable rod is then lowered and the bottom parts swung to the horizontal position, closing the trap at its lower end. The trap is then lifted out of the container by means of the bail which is attached to it and the trap is then placed on an inclined table adjacent the tank so that the liquid in the trap can flow out through the perforations in its walls onto the table and from thence into the tank. The container is likewise lifted from the tank and placed upon the table to drain. The coal contained in the trap can then be weighed, and the slate can be removed from the container through its doorway, and weighed.

If it is desired to separate bone from slate, the apparatus would be used in the same way, but as bone is more dense than coal a more concentrated solution of zinc chloride will be used for floating the bone than is required for floating the coal.

In the accompanying drawing,

Fig. 1 is a central vertical transverse section through the testing apparatus, showing the bottom of the trap in open position;

Fig. 2 is a similar view, showing the bottom of the trap closed;

Fig. 3 is a section on the line 3—3 of Fig. 2; and,

Fig. 4 is a perspective view of one end of the sample container.

Referring to the drawing, $a$ indicates a tank containing a solution $b$ of zinc chloride of sufficient density to float coal but not dense enough to float slate. A container $c$, for holding the sample of the mixed materials which are to be separated, is adapted to fit easily within the tank. The tank and container are preferably oblong in form and the side walls of the container are finely perforated, as shown at 1, so that the liquid within the tank may flow into the container. The tank and container are approximately of the same height and open at the top.

When a sample of coal is to be tested to ascertain the quantity of slat within it, the sample is placed in the container and the latter is then sunk within the tank. The coal 2 floats in the liquid, and the slate 3 remains on the bottom of the container, as shown in Fig. 1. One end wall of the sample container has a doorway 4 extending to the bottom of the container, and a sliding door 5 normally closes this doorway, but it may be opened to permit the slate to drop out after the container has been removed from the tank, as hereinafter explained.

For removing the coal which separates from the slate in the liquid, I provide a trap *d*, consisting of an oblong sheet metal body 6, finely perforated as shown and adapted to fit closely within the container *c*, the bottom of the trap consisting of two parts 7 and 8, each independently hinged to the rod 9 which extends centrally from one end to the other of the body 6, near its lower edge. The free edges of the parts 7 and 8 are connected by links 10 and 11, respectively, to a rod 12, which extends upwardly through a bearing 13$^a$ at the center of the bail 13, which is connected to the body 6 at its ends. Before inserting the trap into the container, the rod 12 is pulled upwardly, as shown in Fig. 1, and the bottom parts 7 and 8 are thereby swung about the rod 9 as an axis into the position shown in said figure. Then, as the trap is lowered into the container, the door 7—8 will pass through the coal and when it is below the coal the operator will release the rod 12, and the door parts will assume the horizontal positions shown in Fig. 2, closing the lower end of the trap. The operator then grasps the bail 13 and lifts the trap out of the container and places it upon a drainboard or table 14, which is inclined toward the tank *c* and adapted to carry the drainage from the trap into the tank. The liquid flows out of the trap through its perforated wall, leaving the coal on the bottom of the trap. After removing the trap from the container, the latter is removed from the tank and set upon the drainboard. After the liquid has drained out of the container, the slate may be removed by opening the door 5 and dumping out the slate. The coal can be removed from the trap by inverting the latter. By weighing the coal and slate separately, the proportionate amount of each in the sample may be ascertained.

The trap is made to fit rather closely within the container in order that the floating particles of coal may not pass between the walls of these parts of the apparatus, and in order to prevent the container from being lifted by reason of frictional contact with the trap, when the latter is raised, I provide a foot-piece 15 which is connected to the upper part of the container and extends over the side of the tank and downwardly to the ground so that the operator may place his foot on the lower end of this foot-piece, to hold the container against movement while the trap is being withdrawn.

Where the sample contains bone, which is heavier than the pure coal and lighter than the slate, the mixed bone and slate which is left in the container after the removal of the coal may be subjected to a further separation in a similar apparatus containing a solution of zinc chloride of sufficient density to float the bone.

The apparatus is adapted particularly for testing samples of coal taken from cars as they are loaded at the mines, to determine the percentage of impurities in the coal.

What I claim is:

1. An apparatus for testing samples of mixed coal and slate comprising a tank containing a liquid in which coal will float and slate will sink; a container for the samples to be tested, said container adapted to fit within the tank and having a perforated wall, and a trap having a perforated side wall adapted to fit closely within the container, said trap having a transversely extending hinge rod at its lower end, a bottom composed of two parts hinged to said rod and adapted to swing upwardly, and means extending to the top of the tank for swinging said parts.

2. An apparatus for testing samples of mixed coal and slate comprising a tank containing a liquid in which coal will float and slate will sink; a container for the samples to be tested, said container adapted to fit within the tank and having a perforated wall, and a trap having a perforated side wall adapted to fit closely within the container, said trap having a transversely extending hinge rod at its lower end, a bottom composed of two parts hinged to said rod and adapted to swing upwardly, and means for raising and lowering said parts comprising a vertically movable rod and links connecting the latter rod with the free edges of the bottom parts.

3. An apparatus for testing samples of mixed coal and slate comprising a tank containing a liquid in which coal will float and slate will sink; a container for the samples to be tested, said container adapted to fit within the tank and having a perforated wall, and a trap having a perforated side wall adapted to fit closely within the container, said trap having a transversely extending hinge rod at its lower end, a bottom composed of two parts hinged to said rod and adapted to swing upwardly, a bail secured to the upper part of the side wall, said bail having a bearing, a rod extending vertically through said bearing, and links connecting said latter rod with the free edges of the bottom parts.

4. An apparatus for testing samples of coal and slate comprising a tank containing a liquid in which coal will float and slate will sink, a container for the samples to be tested, said container adapted to fit within the tank and having a perforated wall and a door in the lower part of said wall, and a trap having a perforated wall adapted to fit closely within the container, said trap having a hinged bottom and means for swinging said bottom to open and close the same.

5. An apparatus for testing samples of coal and slate comprising a tank containing a liquid in which coal will float and slate will sink, a container for the samples to be tested, said container adapted to fit within the tank and having a perforated wall and a door in the lower part of said wall, a foot-piece secured to the upper part of said wall and adapted to extend over the wall of the tank and downwardly on the outer side thereof, and a trap having a perforated wall adapted to fit closely within the container, a lifting bail and a two-part hinged bottom adapted to swing upwardly.

In testimony whereof I affix my signature.

HOPKIN MORGAN.